Figure 1:
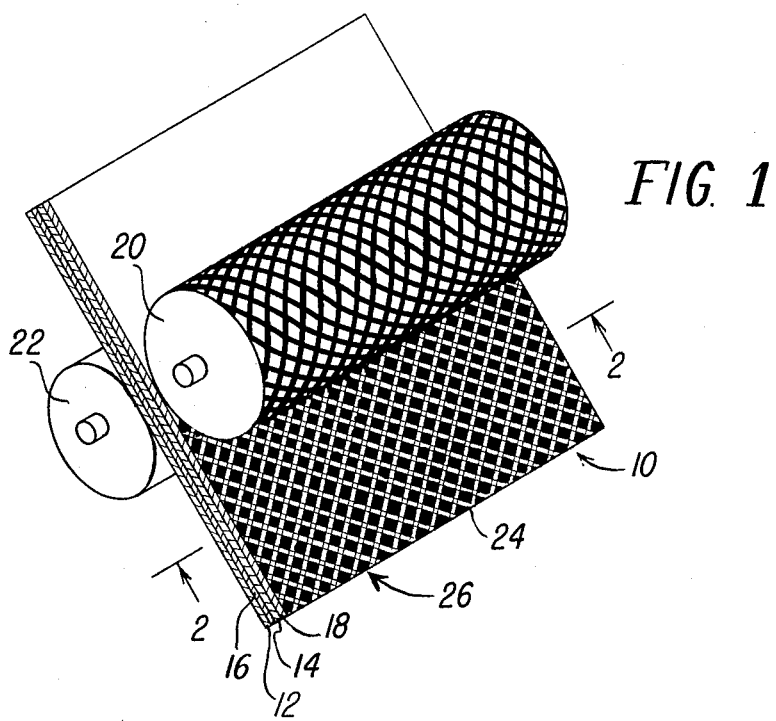

INVENTOR.
Robert O. Ragan
Robert F. Trant
BY
Prangley, Baird, Clayton, Miller & Vogel
Attys.

United States Patent Office 2,915,413
Patented Dec. 1, 1959

2,915,413
NON-BLOCKING ADHESIVE SHEET

Robert O. Ragan, Oak Park, and Robert F. Trant, Chicago, Ill., assignors to United Biscuit Company of America, Chicago, Ill., a corporation of Delaware Application June 13, 1955, Serial No. 515,226

13 Claims. (Cl. 117—15)

This invention relates to a heat-sealable adhesive sheet. More particularly, it relates to a non-blocking heat-sealable adhesive sheet.

Even though sheets carrying a layer of a heat-sealable adhesive are normally heated to elevated temperature as well as subjected to pressure when they are being sealed, it is found in practice that sheets of this type when formed into rolls or placed in stacks tend to block, nonetheless, even at ordinary temperatures. Such blocking or adhering to adjacent surfaces is, of course, undesirable. On the other hand, any means employed to prevent such blocking must not unduly impair the ability of the adhesive layer to form a good seal when it is heated and pressed against a surface to which a seal is to be made.

It is an object of this invention to provide a heat-sealable adhesive sheet which is non-blocking at normal temperatures and which readily seals to other surfaces when subjected to pressure at elevated temperature.

A further object is to provide a method of making such a heat sealable adhesive sheet.

Other objects will appear hereinafter.

It has now been found that the foregoing objects are accomplished by applying a thin layer of a solid non-fibrous, non-blocking material over the surface of the heat-sealable adhesive on the heat sealable sheet in a pattern visible to the unaided eye, which leaves portions of the adhesive exposed which are sufficient in total area to provide a seal at the sealing temperature and pressure of the adhesive and covers the remainder of the adhesive, the dimensions and spacing of the covered and the exposed areas of the adhesive being such as to maintain the exposed adhesive out of contact with the surface of an adjacent sheet engaging the exposed surface of the non-blocking layer and the non-blocking material being a material which adheres to the heat sealable adhesive. The non-blocking material may be soluble in the adhesive at the sealing temperature. Preferably the pattern of the non-blocking layer consists of relatively uniformly spaced spots on a continuous background but the non-blocking material may occupy either the spots or the remaining area as desired.

A particularly convenient way to apply the non-blocking material is to print on the surface of the adhesive a fluid composition such as a solid in a molten state or one comprising a volatile vehicle which evaporates leaving the solid non-blocking material in the desired pattern. The pattern may be identical, for example, with that of a 25 line gravure screen.

In order that the invention may be better understood the following illustrative examples are given. The examples are not to be construed as limiting the scope of the invention, however.

Example 1

A heat-sealable adhesive sheet was prepared in the usual way by coating a 145° F. melting point microcrystalline wax on the paper face of a base sheet consisting of 0.00035 inch soft aluminum foil bonded to a sulfite paper sheet having a ream (500 sheets—24" x 36") weight of 25 pounds by a resin emulsion adhesive. The wax was applied in a uniform layer in the amount of 19 lbs. per ream of base sheet.

A gravure printing plate was prepared in the usual way from an 85 line Ben Day dot screen to print an image of the screen. Using this plate an image of the gravure screen was printed over the entire face of the microcrystalline wax layer with an ink consisting of 58.2% titanium dioxide, 7.3% nitrocellulose, and 34.5% volatile solvent. The ink which was thus deposited in rows of dots running diagonally of the sheet had a thickness when dry of .0005 inch.

When the ink was dry the heat-sealable adhesive sheet was tested for blocking by the following well-known test. Samples of the sheet both with and without the ink deposit were placed under a 2 pounds per square inch pressure and held at 120° F. for 75 hours. At the end of this time, the samples of adhesive sheet without the non-blocking grill pattern blocked solidly, whereas the samples protected with the non-blocking print were free of any sticking. However, when a portion of the sheet was heated to sealing temperature and the wax coated face was pressed against the aluminum face of another portion of the sheet the two portions were sealed tightly together.

Example 2

A heat-sealable adhesive sheet was prepared in the usual way as described in Example 1 except a base sheet of cardboard was substituted for the aluminum foil-paper base and the microcrystalline wax was applied at the rate of 19 lbs. per ream of base sheet.

A letterpress printing plate was prepared in the usual way from a 25 line 3 to 1 gravure screen to print an image of the screen except that this plate was made to print a pattern of lines of the screen instead of the dots or spaces therebetween. Using this plate an image of the gravure screen was printed over the entire face of the wax layer on the cardboard base. The ink which was laid down in diagonal lines consisted of 50% titanium pigment, 48% drying oil, and 2% cobalt drier, and had a thickness when dry of .0005 inch. This sheet also was non-blocking by the above described test but sealed readily to another sheet at sealing temperature under pressure.

Example 3

A fluid composition having a consistency of the order of printing inks was prepared by dispersing a terpene resin having a melting point of 100° C., such as that sold under the trademark "Piccopale #100" in anhydrous ethyl alcohol in the proportion of 16 grams of resin per 134 cc. of alcohol. Sixteen grams of ethyl cellulose having a viscosity of 7 centipoises, such as that sold under the trademark "Ethocel" was added to serve as a binder. The composition was thoroughly mixed and the procedure of Example 1 was then repeated except that the above composition was used in place of the ink described in Example 1. This sheet when tested as above described by letting it stand under pressure and by using it to form a seal was found to be completely non-blocking in the pressure test at 120° F. but to form an excellent seal at sealing temperature under pressure.

Since the above examples are merely illustrative, it will be understood that the present invention is applicable to other types of heat-sealable adhesive sheet materials than those employed in these examples. In fact, the invention is applicable to any heat-sealable adhesive sheet material comprising an impervious base sheet carrying a coating of a heat-sealable adhesive on one face thereof. The preferred impervious base materials are those set forth above as illustrations. Similarly, the preferred heat-sealable adhesive is microcrystalline wax which may be used alone or combined with 5 to 10% by weight of a synthetic rubber-like material such as polymerized isobutylene, for example, that sold under the trademark "Vistanex" or a copolymer of isobutylene with small percentages of a diene such as the product known as butyl rubber.

The printing procedure disclosed in the above examples is a very convenient way to apply the layer of non-blocking material to the surface of the heat-sealable adhesive. It is within the scope of the invention, however, to employ any other desired method of applying this layer. Similarly, the particular pattern in which the non-blocking material is applied may be varied widely although the grill type pattern provided by the gravure screen has been found to be very satisfactory whether the adhesive is deposited in the dots between the lines or on the lines leaving the dots open. Other patterns such as splatter pattern or a series of either straight parallel lines or zigzag lines or a labyrinthine pattern may be used. The dimensions and spacing of the pattern required to maintain the adhesive out of contact will vary somewhat depending on the stiffness of the base sheet as well as the thickness of the non-blocking layer.

As indicated, the non-blocking material may be insoluble in the heat-sealable adhesive composition even at sealing temperature or may be a material such as the terpene resin or a higher melting point microcrystalline wax which though non-blocking at ordinary temperatures is soluble in the heat-sealable composition at sealing temperature. Suitable materials which are non-blocking at ordinary temperatures and which are soluble at sealing temperature in heat-sealable adhesive compositions based on materials other than microcrystalline wax will be readily apparent to those skilled in the art. It is to be noted, however, that the particular non-blocking material employed with any given heat-sealable composition should have good adhesion to the heat-sealable composition with which it is used.

When a material, for example, such as a high melting point wax, is applied in a molten state to form the non-blocking pattern as above described it is preferable to chill the adhesive sheet prior to applying the molten layer sufficiently to prevent the molten wax from softening the adhesive and to cause the molten wax to congeal rapidly to form the desired pattern. The application of the non-blocking material in the molten state has the distinct advantage of avoiding the necessity of drying to evaporate the vehicle as is necessary when a vehicle is used to provide a fluid composition comprising the non-blocking material.

Figure 2:
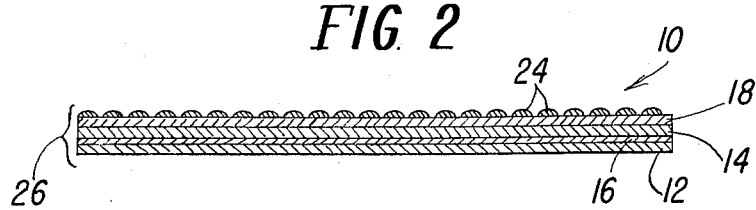

The invention is further illustrated in the attached drawing which forms a part of this specification and in which Figure 1 is a view in perspective showing the application of the non-blocking layer to the adhesive sheet material; and Figure 2 is a view in cross section on the line 2—2 in Figure 1.

A typical adhesive sheet material like that described in Example 1 above is designated generally 10 in the figures of the drawing. As may be seen, it comprises a thin layer 12 of soft aluminum foil. To one face of the foil 12 a sulfite paper sheet 14 is bonded by a resin emulsion adhesive layer 16, the other face of the foil 12 being left exposed. The second face of the paper sheet 14 carries thereon a relatively uniform layer 18 of a heat-sealable microcrystalline wax adhesive.

It is to be noted for convenience in illustration the thickness of the elements of the sheet 10 as shown in the drawing are not in proportion to their actual values. Also, elements of the non-blocking layer in Figure 1 are shown in solid black merely for contrast.

In Figure 1 such a sheet 10 is shown being fed between a pair of suitably spaced rotatable rolls 20 and 22 with the adhesive layer 18 uppermost. Roll 20 is a gravure printing roll prepared in the usual way from a screen, for example, an 85 line Ben Day dot screen, to print an image of the screen. Roll 22 cooperates with the roll 20 to maintain the sheet 10 in proper contact therewith for printing.

A suitable non-blocking composition as described above is applied to the roll 20 in the same way that ink is usually applied to gravure printing rolls by suitable means (not shown). As the sheet 10 passes between the rolls 20 and 22 the roll 20 then prints an image of the gravure screen on the surface of the adhesive 18 in the form of small dots 24 of the non-blocking composition. The non-blocking layer 24 is then dried to provide the finished sheet 26.

The use of the invention will be apparent from the foregoing description. The non-blocking layer prevents the heat-sealable adhesive from adhering to adjoining surfaces when heat-sealable adhesive sheets are placed in stacks and stored at ordinary temperature or when the heat-sealable adhesive sheet is formed into a roll and stored. However, at the sealing temperature and pressure of the adhesive, the non-blocking material on the heat sealable adhesive sheet is permitted to move into the adhesive and the exposed portions of the adhesive are permitted to move into sealing engagement and form a seal with an opposed surface, and in the instances in which the non-blocking material is soluble in the adhesive the non-blocking material, being absorbed at least in part in the adhesive composition, provides an even greater area of adhesive to contact adjacent surfaces and become sealed thereto.

The outstanding advantage of the present invention is that it provides a very easy and convenient means for rendering heat-sealable adhesive sheets non-blocking while at the same time retaining their ability to seal effectively at sealing temperature. It is important, in many uses of heat-sealable adhesive sheets, to be able to store them in rolls or stacks and if the sheets show a tendency to block during such storage substantial quantities of the sheet material may be rendered useless.

It is apparent that many widely different embodiments of this invention may be made without departing from the spirit and scope thereof and, therefore, it is not intended to be limited except as indicated in the appended claims.

We claim:

1. A non-blocking heat-sealable adhesive sheet material disposed in multiple layers each comprising a relatively impervious base sheet, a layer of heat-sealable thermoplastic solid adhesive on one face of said base sheet and a solid non-fibrous, non-blocking material on the surface of said heat-sealable adhesive layer arranged in a definite pattern which leaves portions of the adhesive exposed, which exposed portions are sufficient in total area to provide a seal at the sealing temperature and pressure of the adhesive, and covers the remainder of the adhesive, the dimensions and spacing of the covered and exposed areas of the adhesive and the thickness of the non-blocking material being such as to maintain the exposed adhesive out of contact with the surface of an adjacent sheet in said layers engaging the exposed surface of the non-blocking material and permit the non-blocking material to move into the adhesive and permit the exposed portions of the adhesive to move into sealing engagement with an opposed surface at the said sealing temperature and pressure of the adhesive and form a seal.

2. A sheet as described in claim 1 in which the non-blocking material is soluble in the adhesive at sealing temperature.

3. A sheet as described in claim 1 in which the non-blocking material is ink solids.

4. A sheet as described in claim 1 in which the heat-sealable adhesive consists essentially of microcrystalline wax.

5. A sheet as described in claim 1 in which the heat-sealable adhesive consists essentially of microcrystalline wax and in which the non-blocking material is soluble in the adhesive at sealing temperature.

6. A sheet as described in claim 1 in which the pattern of the non-blocking material is a pattern of lines having about the dimensions and configuration of a 25 line 3 to 1 gravure screen.

7. A sheet as described in claim 1 in which the pattern of the non-blocking material is a pattern of dots having about the dimensions and configuration of an 85 line Ben Day dot screen.

8. A method of making a non-blocking heat-sealable adhesive sheet material to be disposed in multiple layers which comprises applying a solid, non-fibrous, non-blocking material over the surface of the heat-sealable thermoplastic solid adhesive on the heat-sealable adhesive sheet in a definite pattern visible to the unaided eye which leave portions of the adhesive exposed, which exposed portions are sufficient in total area to provide a seal at the sealing temperature and pressure of the adhesive, and covers the remainder of the adhesive, the dimensions and spacing of the covered and exposed areas of the adhesive and the thickness of the non-blocking material being such as to maintain the exposed adhesive out of contact with the surface of an adjacent sheet in said layers engaging the exposed surface of the non-blocking material and permit the non-blocking material to move into the adhesive and permit the exposed portions of the adhesive to move into sealing engagement with an opposed surface at the said sealing temperature and pressure of the adhesive and form a seal.

9. A method as described in claim 8 in which the non-blocking material is distributed in a volatile liquid vehicle to form a fluid composition which is applied to the surface of the adhesive and deposits the non-blocking layer upon evaporation of the vehicle.

10. A method as described in claim 8 in which the non-blocking material is distributed in a volatile liquid vehicle to form a fluid composition which is applied to the surface of the adhesive by a printing plate to form the pattern and deposits the non-blocking layer in the said pattern upon evaporation of the vehicle.

11. A method as described in claim 8 in which the non-blocking material is distributed in a volatile liquid vehicle to form a fluid composition which is applied to the surface of the adhesive by a letterpress printing plate which prints a pattern of lines having about the dimensions and configuration of a 25 line 3 to 1 gravure screen, the non-blocking layer being deposited in said pattern upon evaporation of the vehicle.

12. A method as described in claim 8 in which the non-blocking material is distributed in a volatile liquid vehicle to form a fluid composition which is applied to the surface of the adhesive by a gravure printing plate which prints a pattern of dots having about the dimensions and configuration of an 85 line Ben Day dot screen, the non-blocking layer being deposited in said pattern upon evaporation of the vehicle.

13. A method as described in claim 8 in which the non-blocking material is applied in a molten state to the surface of the adhesive by a printing plate to form the pattern, the adhesive sheet having previously been chilled sufficiently to prevent the molten material from softening the adhesive and to cause the material in the applied layer to congeal rapidly to form the non-blocking layer in the said pattern.

References Cited in the file of this patent

UNITED STATES PATENTS

| | | |
|---|---|---|
| 2,322,048 | Nadeau | June 15, 1943 |
| 2,515,423 | Ptasnik | July 18, 1950 |
| 2,768,906 | James | Oct. 30, 1956 |